Patented June 3, 1952

2,599,365

UNITED STATES PATENT OFFICE 2,599,365

PIPERIDINE DERIVATIVES

Leo Berger, Nutley, and John Lee, Essex Fells, N. J., assignors to Hoffmann-La Roche Inc., Nutley, N. J., a corporation of New Jersey No Drawing. Original application January 26, 1949, Serial No. 73,004. Divided and this application October 26, 1951, Serial No. 253,452

9 Claims. (Cl. 260—293)

The present invention relates to new piperidine compounds and the acid addition salts thereof, as well as to methods for their production.

More particularly the invention relates to a new method for the manufacture of compounds, which in the form of the free base, can be represented by the following formula:

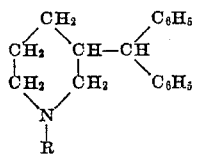

(A)

In the above formula R stands for a lower alkyl radical, such as methyl, ethyl, propyl, isopropyl, butyl, isobutyl, tertiary butyl, pentyl, and the like. The intermediates formed in the synthesis are also embraced within the invention and can be represented in the form of the free base by the general formula:

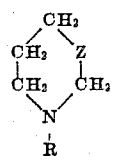

(B)

in which R has the same meaning already assigned thereto and Z stands for

$=CH-C(OH)(C_6H_5)_2$ or

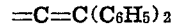
$=C=C(C_6H_5)_2$

The free bases (A) and (B) readily form acid addition salts with both organic and inorganic acids, as for example, hydrochloric, hydrobromic, phosphoric, sulfuric, tartaric, acetic, oxalic acids, and the like. The compounds are useful for pharmaceutical purposes, more particularly, as spasmolytics.

According to the process of the present invention, a 1-alkyl-3-benzoyl-piperidine or 1-alkyl-piperidine-3-carboxylic acid ester (I) is reacted with a phenyl magnesium halide such as phenyl magnesium bromide, iodide or chloride, or with phenyl lithium (II) to form a 1-alkyl-3-(α-hydroxy-benzohydryl)-piperidine (III), which is dehydrated to obtain a 1-alkyl-3-benzohydrylidene-piperidine (IV), and the latter compound hydrogenated to produce a 1-alkyl-3-benzohydryl-piperidine (A).

The new synthesis can be illustrated schematically as follows:

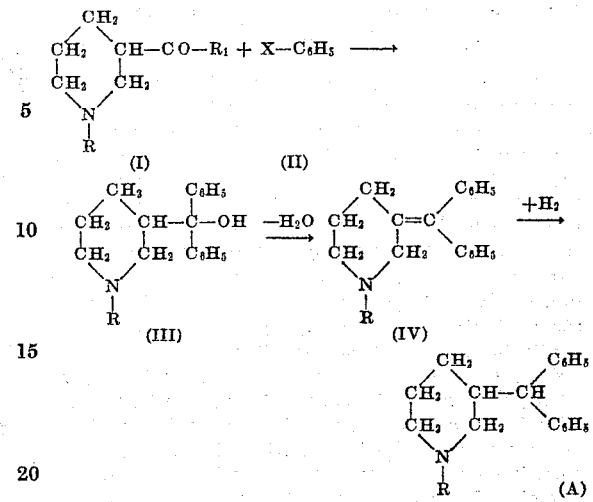

R in the above formulae has the same meaning as already assigned thereto, $R_1$ represents a lower alkoxy or aralkoxy group, such as methoxy, ethoxy, propyloxy, benzyloxy, or a phenyl radical; and X stands for lithium or Mg halogen.

The proportion of compounds (I) and (II) may be varied, but it is preferred to employ one mol of the phenyl lithium or phenyl magnesium halide to one mol of the 1-alkyl-3-benzoyl-piperidine. When the 1-alkyl-piperidine-carboxylic acid ester is employed, one mol of the latter is used to at least two mols of the phenyl lithium or phenyl magnesium halide.

The complex which is formed by the reaction (I) + (II)→(III)) is readily hydrolyzed with water, or preferably with an acid, such as hydrochloric acid, to produce the tertiary alcohol, 1-alkyl-3-(α-hydroxy-benzohydryl)-piperidine. The compound may be isolated as the free base or the acid addition salt.

The dehydration of compound (III) can be carried out by means of any suitable dehydrating agent, such as potassium hydrogen sulfate, or a concentrated aqueous solution of an acid like hydrobromic acid, hydrochloric acid, sulfuric acid, and the like. The resulting 1-alkyl-3-benzohydrylidene-piperidine is obtained in the form of the corresponding acid addition salts. By treating the acid addition salts with alkaline agents, such as sodium hydroxide, ammonium hydroxide, potassium carbonate, and the like, they are readily converted into the free base.

Hydrogenation of the 1-alkyl-3-benzohydrylidene-piperidine is preferably carried out in the presence of a hydrogenation catalyst. Catalysts, such as platinum oxide and palladium on charcoal, have been found to be most suitable. The hydrogenation may be carried out in an inert solvent, such as methanol or ethanol. We have found it advantageous to hydrogenate under pressure since the duration of the hydrogenation is thus shortened. Any suitable pressure may be employed, as for example, from 1 to 200 atmospheres.

The 1-alkyl-piperidine-3-carboxylic acid esters (I) employed as a starting material can be prepared from a nicotinic acid ester by treating the latter with an alkyl toluene-sulfonate to produce the corresponding quaternary N-alkyl-3-carboxylic acid ester-pyridinium sulfonate, and then hydrogenating this compound. During the hydrogenation toluenesulfonic acid is split off. The procedure is illustrated by the manufacture of 1-ethyl-3-carbethoxy-piperidine, as follows:

*1-ethyl-3-carbethoxy-piperidine*

924 grams of ethyl-p-toluenesulfonate and 700 grams of ethyl nicotinate were mixed and stirred on a steam bath. When the internal temperature reached 95–100° C. a spontaneous reaction occurred and the internal temperature rose to 185° C. The reaction mixture was stirred and heated slightly for 1.5 hours until the temperature remained at 90° C. A liter of alcohol was then added to thin the reaction mixture. The quaternary salt formed is a water soluble, thick glass which was hydrogenated as follows to form 1-ethyl-3-carbethoxy-piperidine.

The quaternary salt was dissolved in four liters of ethanol and 65 grams of Raney nickel were added. The mixture was hydrogenated at 1,000 pounds per square inch and 85–90° C. The absorption of hydrogen was over in an hour and the alcohol solution was filtered from the catalyst and concentrated to dryness. The residue was dissolved in ice-water and made alkaline to phenolphthalein with sodium hydroxide. The solution was saturated with sodium chloride and the base which separated was extracted with ether. The ether solution was dried, concentrated to dryness and fractionated. The 1-ethyl-3-carbethoxy-piperidine thus obtained boiled at 63–65° C. 3–4 mm.; $n_D^{24}=1.4510$. The oxalate was prepared by treating with oxalic acid. Recrystallized from ethyl acetate, the oxalate salt obtained melted at 105–107° C.

The 1-alkyl-3-benzoyl-1-piperidines can be obtained from the 1-alkyl-piperidine-3-carboxylic acid esters by transforming the latter to the free acid hydrochloride, converting the acid hydrochloride into the corresponding acid chloride hydrochloride, and reacting the latter in the presence of aluminum chloride with benzene. The procedure is illustrated by the manufacture of 1-methyl-3-benzoyl-piperidine, as follows:

*1-methyl-3-benzoyl-piperidine*

72 grams of the hydrochloride of N-methyl-nipecotic acid were mixed with 500 cc. of dry benzene and 120 cc. of thionylchloride. The salt was partly soluble but the main portion remained suspended. A half liter of chloroform was added and the mixture refluxed for 4 hours. The reaction mixture was then concentrated to dryness and scrubbed with dry ether. The insoluble salt was filtered and washed with dry ether and dried in vacuo over concentrated sulfuric acid and potassium hydroxide pellets. There was obtained the hydrochloride of the acid chloride of 1-methyl-nipecotic acid.

About 20 grams of the hydrochloride of 1-methyl-nipecotic acid chloride thus obtained were suspended in 500 cc. thiophene free dry benzene with stirring. 20 grams of powdered aluminum chloride were added in small portions. The reaction mixture was heated cautiously and a vigorous reaction set in at 50–60° C. The reaction was kept at this temperature until all of the aluminum chloride was added in a period of 20–25 minutes. Upon completion of the addition the reaction mixture was refluxed for 3–4 hours. At the end of this time the evolution of HCl gas almost ceased. The flask was cooled and the reaction mass was poured onto cracked ice. The mixture was extracted with ether wet with 6 N hydrochloric acid. The organic layer was discarded. The aqueous layer was basified with 6 N sodium hydroxide and extracted with a mixture of ether and benzene, washed neutral, and dried. The benzene solution was concentrated to dryness and the residue was fractionated to yield 1-methyl-3-benzoyl-piperidine as a yellow oil boiling at 120°/1 mm.; $n_D^{25}=1.5400$. The oil was insoluble in excess carbonate or alkali but formed a gummy hydrochloride. A portion was converted to the picrate (M. P. 188°–189° C.) and recrystallized from ethyl alcohol.

In a similar manner starting from N-ethyl-nipecotic acid, there can be obtained 1-ethyl-3-benzoyl-piperidine. N-ethyl-nipecotic acid hydrochloride can be obtained by saponifying 1-ethyl-3-carbethoxy-piperidine with sodium hydroxide, and treating the base with hydrochloric acid. The compound melts at 171–173° C.

The following examples will serve to illustrate the invention:

*Example 1*

*1-ethyl-3-(α-hydroxy-benzohydryl)-piperidine*

To phenyl lithium prepared in the well-known manner from 147 grams of bromobenzene and 13.1 grams lithium wire in ether, 55.5 grams of 1-ethyl-3-carbethoxy-piperidine as the free base in ether (1:1) were added at 0° to +5° C. The solution was stirred at room temperature for 30 minutes and finally refluxed for two hours. The color of the solution changed from white to tan to purple in the course of the reaction. The reaction mixture was left to stand for 16 hours, after which the lithium complex formed was hydrolyzed with concentrated hydrochloric acid and ice. The ether solution was discarded and the aqueous layer was cooled with ice and made alkaline (pH=10) with 20 per cent NaOH. A solid base separated. The base was dissolved in ether, the ether solution washed with water, dried for 16 hours, filtered and concentrated to dryness. A small portion of the resultant solid base was recrystallized from n-hexane to yield a colorless crystalline product melting at 99–101° C. The remaining bulk of the base was dissolved in ether and converted to the hydrochloride with HCl gas. The resultant salt was recrystallized from acetone plus methanol to yield a colorless crystalline product which melted at 209–211° C. The product was the desired hydrochloride of 1-ethyl-3-(α-hydroxy-benzohydryl)-piperidine. The hydrochloride is soluble to 1 per cent in water at 5–10° C.

The 1-ethyl-3-(α-hydroxy-benzohydryl)-piperidine can be prepared in the same manner as described above by substituting phenyl magnesium bromide for the phenyl lithium.

To prepare the phosphate salt, the crystalline 1-ethyl-3-(α-hydroxy-benzohydryl)-piperidine base was dissolved in dry acetone and 1.1 moles of phosphoric acid (85 per cent phopshoric acid) in dry acetone were added slowly with stirring. The phosphate crystallized instantly and was filtered off. It was then washed with cold acetone and ether. The salt melted at 128–132° C. after previous sintering, and analysis showed it to contain one molecule of water of crystallization. The phosphate salt is soluble to 15 per cent in water at 5–10° C.

When the salt was recrystallized from dioxane, the solvent of crystallization was changed and a colorless crystalline product consisting of large prisms was obtained analyzing for one molecule of dioxane of crystallization. The salt obtained melts at 170–174° C. after sintering at 162° C.

Prepared in a similar manner as above, except that tartaric acid is substituted for phosphoric acid, a water-soluble tartrate of 1-ethyl-3-(α-hydroxy-benzohydryl)-piperidine was obtained which was recrystallized from ethyl acetate to yield a fine crystalline powder, melting at 85–88° C.

EXAMPLE 2

*1-ethyl-3-benzohydrylidene-piperidine hydrochloride*

13 grams of 1-ethyl-3-(α-hydroxy-benzohydryl)-piperidine base were dissolved in 100 cc. of 40 per cent HBr and 60 cc. of glacial acetic acid and the resultant solution was heated for three hours at reflux temperature. The solution was cooled and made basic with 6 N NaOH. The crude base obtained was converted to the hydrochloride in dry ether with HCl gas. Recrystallized from acetone 1-ethyl-3-benzohydrylidene-piperidine hydrochloride was obtained as colorless crystals, melting at 190–193° C.

EXAMPLE 3

*1-ethyl-3-benzohydryl-piperidine hydrochloride*

1.2 grams of 1-ethyl-3-benzohydrylidene-piperidine hydrochloride were dissolved in 100 cc. ethyl alcohol and 100 mg. of platinum oxide added. The mixture was hydrogenated at 50 pounds per square inch pressure at room temperature until the absorption ceased. The reaction mixture was filtered from the catalyst and concentrated to dryness and the crystalline residue was recrystallized from acetone plus methanol to yield colorless crsytals melting at 194–195° C. On treating the salt with sodium hydroxide, the free base was obtained.

EXAMPLE 4

*1-methyl-3-(α-hydroxy-benzohydryl)-piperidine*

Phenyl lithium was prepared from 8 grams bromobenzene and 0.5 gram lithium wire in the usual manner. 5.6 grams of 1-methyl-3-benzoyl-piperidine in ether were added at 5–10° C. The reaction mixture was stirred at room temperature and finally refluxed for 2–3 hours. The flask was then cooled and the reaction mixture was decomposed cautiously with ice water, thereby forming 1-methyl-3-(α-hydroxy-benzohydryl)-piperidine base which remains in the ether solution. The ether solution was dried and HCl gas injected.

The crude hydrochloride that was obtained was recrystallized twice from acetone-methanol to yield colorless crystals of 1-methyl-3-(α-hydroxy-benzohydryl)-piperidine hydrochloride melting at 230–231° C. The base was obtained by treating the salt with sodium hydroxide.

The 1-methyl-3-(α-hydroxy-benzohydryl)-piperidine can be prepared in the same manner by substituting phenyl magnesium bromide for the phenyl lithium.

EXAMPLE 5

*Preparation of 1-methyl-3-benzohydrylidene-piperidine hydrochloride*

3 grams of 1-methyl-3-(α-hydroxy-benzohydryl)-piperidine base were mixed with an equal weight of freshly fused $KHSO_4$ and heated up to 200° C. in vacuo until fusion and dehydration took place. The salt was dissolved in water, made basic with 6 N NaOH, and the base that separated was extracted with ether. The ether solution was dried and filtered, and dry HCl gas was introduced to precipitate the hydrochloride of the dehydrated base. The 1-methyl-3-benzohydrylidene-piperidine hydrochloride thus obtained melted at 243–245° C. after recrystallization from acetone-ether.

EXAMPLE 6

*Preparation of 1-methyl-3-benzohydryl-piperidine*

750 mg. of the benzohydrylidene hydrochloride obtained in Example 5 were dissolved in 50 cc. of absolute alcohol and 50 mg. platinum oxide was added, and the reaction mixture was hydrogenated at 50 pounds per square inch pressure at room temperature for 1.5 hours. The hydrogen absorption was complete in 20–30 minutes. The reaction mixture was filtered from the catalyst and the solvent was removed via vacuum distillation. The crude hydrochloride was recrystallized from acetone-ether and there was obtained in quantitative yield colorless crystals of 1-methyl-3-benzohydryl-piperidine hydrochloride, melting at 240–242° C. On treating the salt with sodium hydroxide, the free base was obtained.

This application is a division of our copending application Serial No. 73,004, filed January 26, 1949.

We claim:
1. A compound of the group consisting of 1-alkyl-3-benzohydrylidene-piperidines and the acid addition salts thereof.
2. A 1-alkyl-3-benzohydrylidene-piperidine.
3. An acid addition salt of a 1-alkyl-3-benzohydrylidene-piperidine.
4. 1-ethyl-3-benzohydrylidene-piperidine.
5. An acid addition salt of 1-ethyl-3-benzohydrylidene-piperidine.
6. 1-ethyl-3-benzohydrylidene-piperidine hydrochloride.
7. 1-methyl-3-benzohydrylidene-piperidine.
8. An acid addition salt of 1-methyl-3-benzohydrylidene-piperidine.
9. 1-methyl-3-benzohydrylidene-piperidine hydrochloride.

LEO BERGER.
JOHN LEE.

No references cited.